United States Patent
Adragna

(10) Patent No.: US 9,083,250 B2
(45) Date of Patent: Jul. 14, 2015

(54) METHOD AND CIRCUIT FOR CONTROLLING A SWITCHING REGULATOR

(71) Applicant: STMicroelectronics S.r.l., Agrate Brianza (IT)

(72) Inventor: Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 216 days.

(21) Appl. No.: 13/951,259

(22) Filed: Jul. 25, 2013

(65) Prior Publication Data

US 2014/0029316 A1    Jan. 30, 2014

(30) Foreign Application Priority Data

Jul. 27, 2012    (IT) .............. MI2012A1325

(51) Int. Cl.
*H02M 3/335* (2006.01)
*H02M 3/315* (2006.01)

(52) U.S. Cl.
CPC .......... *H02M 3/33507* (2013.01); *H02M 3/315* (2013.01); *H02M 3/335* (2013.01); *H02M 3/33523* (2013.01); *H02M 3/33515* (2013.01); *Y02B 70/1433* (2013.01)

(58) Field of Classification Search
CPC ..................................... H02M 3/335

USPC .......... 363/21.01, 21.12, 21.13, 21.17, 21.18; 323/282, 283, 285
See application file for complete search history.

(56) References Cited

U.S. PATENT DOCUMENTS

| 7,511,929 | B2 | 3/2009 | Hachiya | |
|---|---|---|---|---|
| 2003/0090254 | A1 | 5/2003 | Strijker | |
| 2010/0315838 | A1* | 12/2010 | Mao et al. | 363/16 |
| 2011/0182088 | A1 | 7/2011 | Lidak et al. | |
| 2011/0261596 | A1* | 10/2011 | Zong et al. | 363/21.13 |
| 2012/0113689 | A1* | 5/2012 | Chen et al. | 363/21.17 |
| 2013/0258723 | A1* | 10/2013 | Fang et al. | 363/21.17 |

\* cited by examiner

*Primary Examiner* — Matthew Nguyen
*Assistant Examiner* — Trinh Dang
(74) *Attorney, Agent, or Firm* — Seed IP Law Goup PLLC

(57) ABSTRACT

A method for controlling a switching regulator includes defining a waiting time during which a trigger signal corresponding to a recirculation signal of the switching regulator is ignored holding a control switch in an open condition, and detecting a number of local valleys of the recirculation signal during the waiting time. In particular, defining the waiting time is performed for each switching cycle by adding a first value, which is determined on the basis of a load on the regulator, to a second variable value, which is proportional to the number valleys detected during the waiting time of the preceding switching cycle.

18 Claims, 16 Drawing Sheets

*FIG. 1    (Prior Art)*

METHOD AND CIRCUIT FOR CONTROLLING A SWITCHING REGULATOR

BACKGROUND

1. Technical Field

The present disclosure relates to a method for controlling a switching regulator.

The present disclosure also relates to a control circuit for a switching regulator.

The disclosure concerns in particular, but not exclusively, a method and a circuit for controlling a switching regulator of the quasi-resonant flyback type and the following description is made with reference to this specific field of application with the sole purpose of simplifying its presentation.

2. Description of the Related Art

Switching regulators are used in power supply systems to provide a constant voltage or current in output as the supply voltage varies and as the load applied to the output terminals varies. The quasi-resonant (QR) flyback switching regulator is a regulator with an insulation arranged between the input terminals and the output terminals made from a magnetizable part, for example a transformer, which is magnetized and demagnetized through a switch. The switch is made through a switching transistor of the bipolar, MOSFET or similar type.

An example of a QR flyback regulator 1 is shown in FIG. 1 whereas FIG. 2 shows the relative waveforms. During the closed time of the switch 5, Ton, there is an accumulation of energy in the transformer 2 and during the open time of the switch, Toff, with the demagnetization of the transformer, the energy stored in the transformer is supplied to the output circuit to constantly feed the load. A secondary demagnetization current Is is supplied to the output circuit through the secondary winding $L_S$ of the transformer 2.

A control circuit 10 detects, directly or through a sensor, the demagnetization state of the transformer 2, and activates the switch 5 when successful demagnetization is detected.

In the switching regulator of FIG. 1, the control circuit 10 detects the demagnetization through a sensor defined by an auxiliary winding $L_{AUX}$ of the transformer 2. It should be noted that the oscillation of the voltage Vaux on the auxiliary winding corresponds to the oscillation of the voltage $V_{DS}$ through the switch 5 scaled by the ratio of the coils between the primary winding $L_P$ and the auxiliary winding $L_{AUX}$.

The control circuit 10 comprises a Zero-Current Detection or Zero-Crossing Detection (ZCD) circuit 12, which has a terminal associated, through a resistance $R_{ZCD}$, with the auxiliary winding $L_{AUX}$ of the transformer 2. When the voltage Vaux on the auxiliary winding detected by the terminal, on the negative-going edge, is less than a trigger threshold $V_{ZCDtrig}$, the ZCD circuit 12 generates a trigger signal that sets the PWM latch 15 causing the switch 5 to be switched on. In order to "arm" the ZCD circuit 12 before detecting the trigger threshold $V_{ZCDtrig}$, the terminal detects a voltage Vaux on the rising edge that exceeds a first threshold $V_{ZCDarm}$ of greater value than the trigger threshold $V_{ZCDtrig}$, as indicated in the waveform of FIG. 2.

With a trigger voltage $V_{ZCDtrig}$ fixed at a value close to zero, the demagnetization of the transformer 2 is detected when the voltage on the auxiliary winding $L_{AUX}$ is zero whereas the voltage on the primary winding $L_P$, which corresponds to the voltage $V_{DS}$ that passes through the switch 5, is equal to the input voltage Vin.

During the open time Toff of the switch 5, the voltage $V_{DS}$ stabilizes, after an initial transient, at a practically constant reference value (Vr+Vin), whereas the secondary demagnetization current Is is supplied to the output circuit.

As highlighted in FIG. 3, due to the presence of parasitic components in the circuit 1, after demagnetization when the secondary demagnetization current Is goes to zero, the voltage $V_{DS}$ takes on a damped sinusoidal oscillation the waveform of which has a period equal to $T_R$ with relative maximum values and relative minimum values.

Based on these properties, the voltage $V_{DS}$, i.e., its image Vaux obtained at the ends of the auxiliary winding $L_{AUX}$, can be taken as recirculation signal, i.e., signal capable of highlighting when the energy stored in the transformer during the accumulation time Ton is recirculating (Is>0) and when said recirculation ends (Is=0).

In order to reduce the power losses to the minimum, during the switching of the switch 5, operation of the "valley-switching" type is foreseen, in which the switch is activated at a valley of the damped oscillation of the voltage $V_{DS}$.

Through a time delay portion of the ZCD circuit 12, the switch is activated at the first valley of the voltage $V_{DS}$ that occurs after a delay equal to ¼ the period $T_R$ after demagnetization when the secondary demagnetization current Is goes to zero.

With respect to the standard flyback regulator which has a fixed switching frequency, the QR flyback regulator has some advantages, like a low presence of Electro-Magnetic Interference (EMI) and better safety in short-circuit conditions.

However, the QR flyback regulator 1, in the presence of a variation of the input voltage or a variation of the load, varies the switching frequency.

For example, in the case of a reduction of the load, the frequency tends to increase and, as known, the power losses are proportional to the switching frequency of the switch. This leads to a considerable reduction in efficiency of conversion at low loads.

Different solutions are known for reducing the power losses to a minimum in a QR flyback regulator that operates with variable switching frequency.

A solution known as "frequency foldback" or "valley-skipping" foresees to keep the switch 5 in the interdicted state for a time longer than or equal to a waiting time $T_{BLANK}$, i.e. of making the activation impulses generated by the ZCD circuit 12 during the waiting time $T_{BLANK}$ substantially "invisible".

In other words, as shown in FIG. 3, a window F having a duration equal to the waiting time $T_{BLANK}$, is activated upon the deactivation of the switch 5. All of the activation impulses generated by the control circuit are ignored if they fall within the window F, whereas the first activation impulse generated after the waiting time $T_{BLANK}$ makes the switch conduct.

The delay in the activation of the switch with respect to the demagnetization of the transformer can be calculated as:

$$Td_k = \frac{2k-1}{2} T_R$$

where: k=1,2 . . . the number of valleys $T_R$ is the period of the damped sinusoidal oscillation of the voltage $V_{DS}$ after demagnetization of the transformer.

As shown in FIG. 4a, it is advantageous to modulate the waiting time $T_{BLANK}$ as a function of a control voltage $V_{CSref}$ referred to the current detected between the switch and the ground reference voltage $V_{GND}$. In particular, with a reduction in the output load there is a reduction of the control voltage $V_{CSref}$ and a lengthening of the waiting time $T_{BLANK}$.

As shown, on the other hand, in the diagram of FIG. 4b, the switching frequency gradually falls with the increase in input power Pin and based on the number of valleys that are skipped.

During valley-skipping operation it is possible to observe some irregular switching cycles, as shown in FIG. 5, in which the switching takes place with an alternation between the ignored valleys, which identifies a phenomenon called "valley-jump", in which the switching takes place in some cases in the presence of the second valley of the damped sinusoidal oscillation of the voltage $V_{DS}$ and in other cases in the presence of the third valley.

Such a "valley-jump" phenomenon is due to the fact that the switch switches at a discretized value $T_{dK}$, the window F has a value that is fixed as a function of the control voltage $V_{CSref}$, whereas for energy balance the switching should take place in an intermediate point between two contiguous cycles.

The valley jump phenomenon introduces a low-frequency component that creates perturbations in the primary current of the switch and induces an audible noise generated by mechanical vibrations due to the presence of the magnetic components.

The low-frequency noise is a drawback that is more serious in the case in which the switching regulators are contained in portable electronic devices.

Manufacturers of switching regulators have defined, as an internal specification for low-frequency noise, a maximum threshold of 25 dB(A)/20.0 µPa measured at a distance of 5 cm.

Some solutions have been proposed to avoid the occurrence of noise in switching regulators.

One solution is described in United States patent application No. US2011/0182088 to Lidak et al. and it foresees an internal up/down counter the operation of which is schematically shown in FIG. 6 with a number of valleys of between 1 and 4. It is foreseen for there to be hysteresis behavior as a function of the control voltage $V_{CSref}$ of the circuit.

In particular, with a reduction of the output load, which corresponds to a reduction of the control voltage $V_{CSref}$, there is an increase in the number of valley from 1 to 4, whereas with an increase of the output load, and a consequent increase of the control voltage $V_{CSref}$, there is a reduction of the valley down to 1.

Substantially, the control circuit is interdicted at a selected number of valleys until a significant change in the output load.

A further solution is shown in FIG. 7 and it is made by the company Infineon and inserted in the QR Flyback controller known by the reference identification ICE2QS03x.

The solution foresees the presence of two counters, with the first up/down counter that indicates the number of valleys that are to be skipped, whereas the second counter detects the number of valleys after the demagnetization of the transformer, by activating the switch when the number of the second counter equals the number of the first counter.

The counting direction of the first counter depends on the control voltage $V_{CSref}$ that is detected in sampling intervals based on an internal clock, which in the case indicated is equal to T=48 ms. A voltage band $B_V$ is identified between a low first value $V_{FBZL}$ and a high second value $V_{FBZH}$.

When the sampled value of the control voltage $V_{CSref}$ is within the band $B_V$ the first counter stays unchanged, and when the sampled value is below the first value $V_{FBZL}$ the first counter is increased by one, but if it is higher than the second value $V_{FBZH}$ the first counter is decreased by one, and if the value of the control voltage $V_{CSref}$ is greater than a third maximum threshold $V_{FBR1}$, the first counter is automatically brought to one.

The height of the band $B_V$ is calculated so that the counter remains unchanged with a constant output load. Therefore, the activation of the switch takes place in the presence of the number of valleys of the second counter until the output load changes significantly.

BRIEF SUMMARY

Although the solutions outlined above achieve their purpose and are advantageous from some points of view, they do have a certain complexity.

In view of the described state of the art, the inventors have recognized a need for an alternative method to known methods and an alternative control circuit to the known ones, which makes it possible to avoid the phenomenon of the valley jump and, consequently, to reduce the noise created by the mechanical vibrations of the magnetic components, in an efficient and functional manner.

The inventors have further recognized that it would be beneficial to provide a method that is easy to implement, and to obtain a control circuit that has low bulk with a structure that is simple to make and compact and also suitable for use in portable applications.

According to an embodiment, the valley jump phenomena is prevented in each switching cycle by dynamically regulating the blanking time.

BRIEF DESCRIPTION OF THE SEVERAL VIEWS OF THE DRAWINGS

The characteristics and advantages of various embodiments will become clear from the following description, made hereafter, of a practical embodiment, given for indicating and not limiting purposes, with reference to the attached drawings, in which.

DETAILED DESCRIPTION

Figure 1:
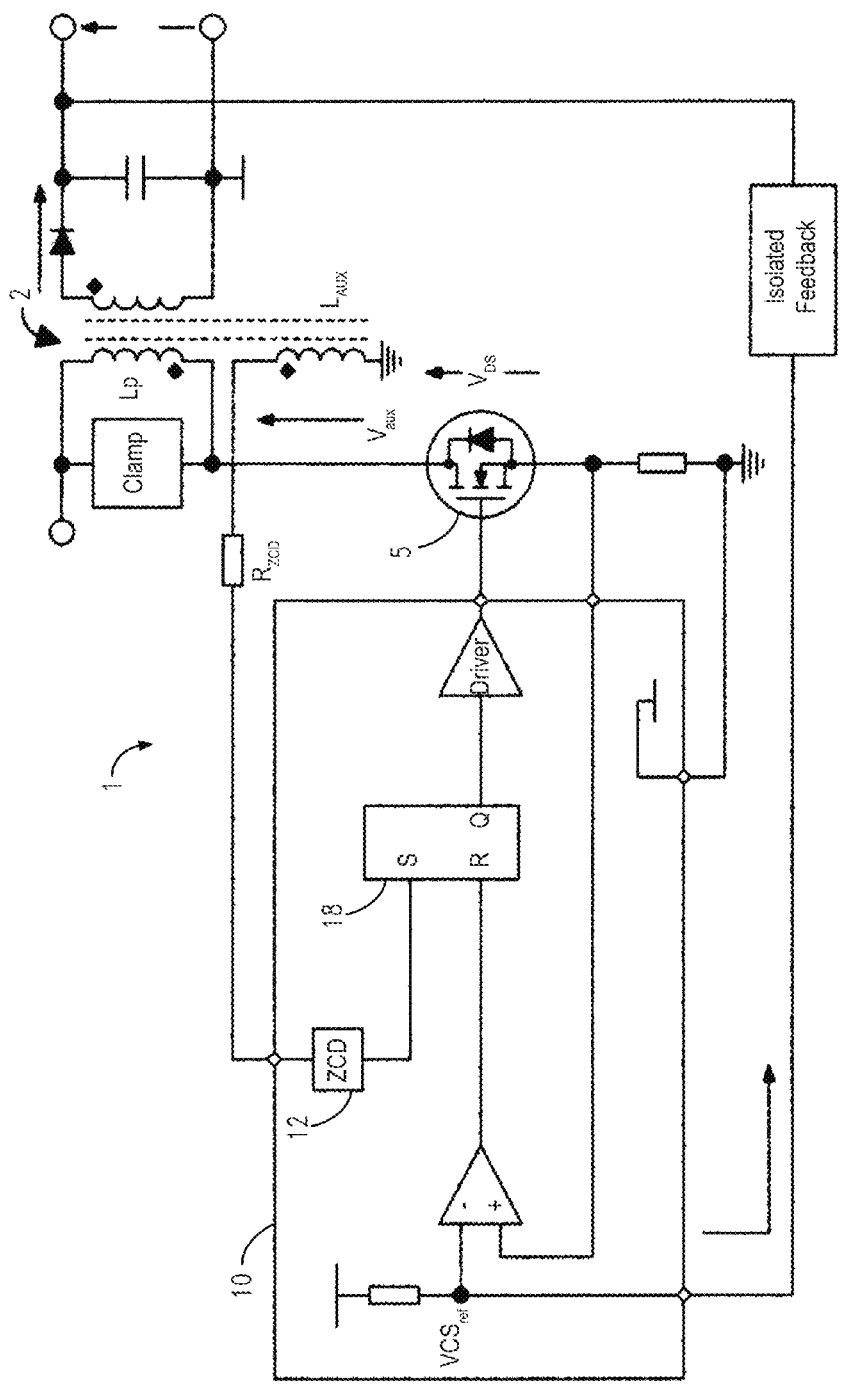
FIGS. 1 and 2 respectively show a block diagram of a QR flyback switching regulator and the relative waveforms, according to known art.
Figure 8:
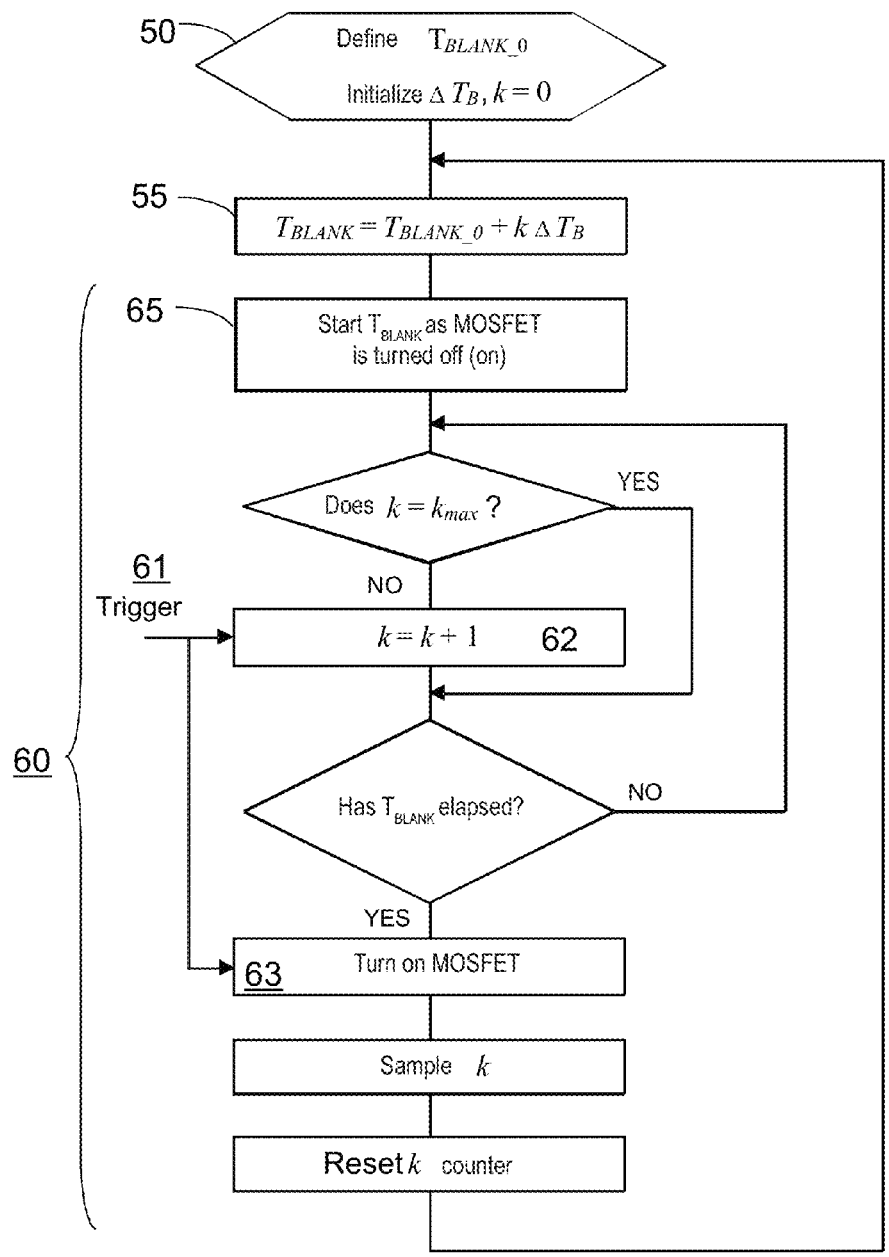
FIG. 8 shows a flow-chart that shows the method according to an embodiment.
Figure 9A:
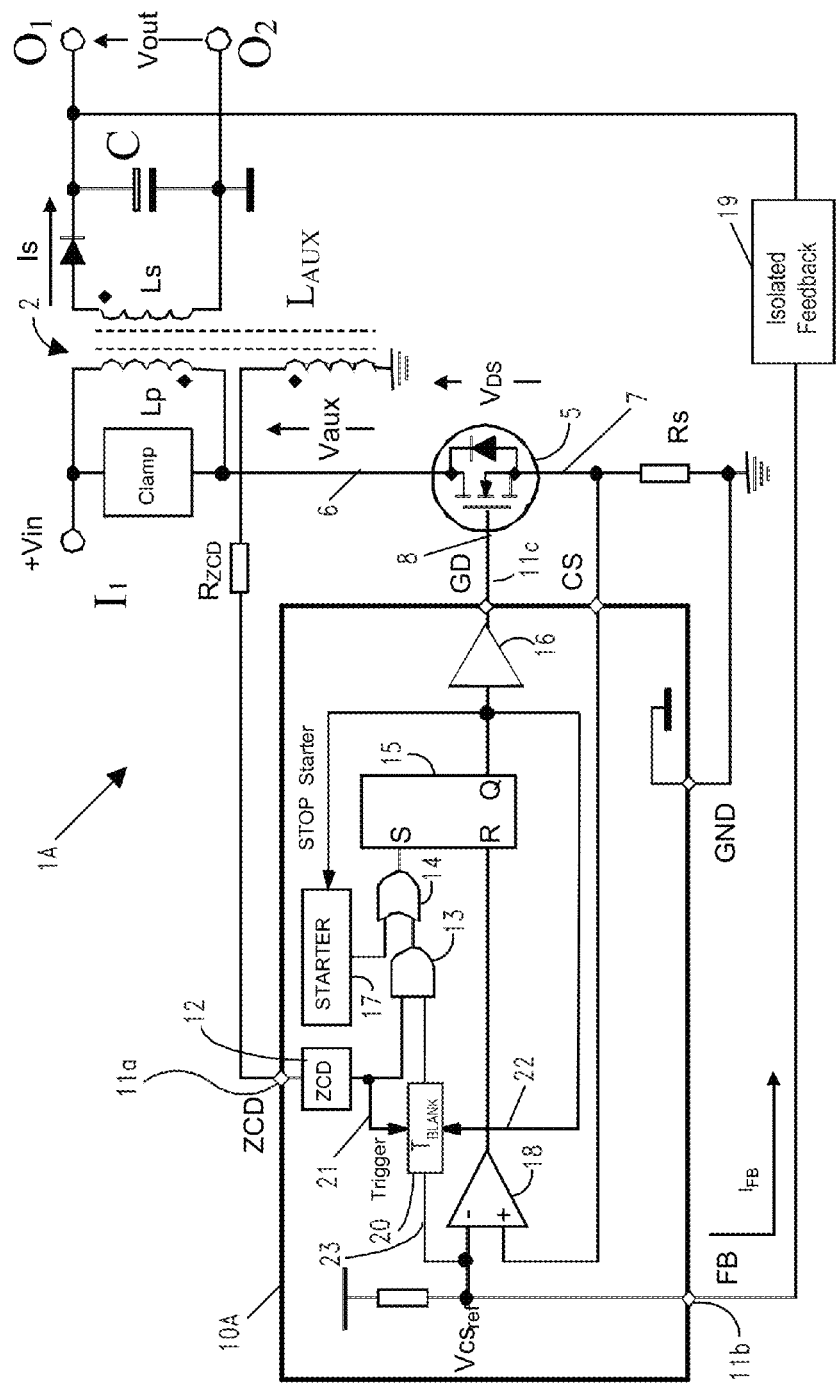
FIG. 9A is a block diagram of a QR flyback switching regulator according to an embodiment.

FIG. 8 shows the flow diagram of a method, according to one embodiment of the present invention, for controlling a switching regulator 1A, shown in FIG. 9A, that is similar to the switching regulator 1 represented in FIG. 1 and described above, for which parts and details having the same structure and function will be indicated with the same reference numerals and letters.

As shown in FIG. 9A, the switching regulator 1A comprises a transformer 2 coupled with and controlled by a switch 5.

The transformer 2 comprises a primary winding Lp connected to an input terminal $I_1$ of the switching regulator 1 and a secondary winding Ls arranged between the output terminals $O_1$, $O_2$.

The switch 5 is arranged in series with the primary winding Lp and coupled with a reference voltage $V_{GND}$ that in an embodiment is the ground voltage.

The switch 5 is alternately driven in conduction status and in interdiction status by a PWM control signal $V_{GD}$ to control the transformer 2 in periodic switching cycles Dn.

The switch 5 has a first conduction terminal 6, a second conduction terminal 7 and a first control terminal 8 that receives the PWM control signal $V_{GD}$.

In an embodiment, the switch 5 is made from a transistor, for example an N channel MOSFET, as indicated in the figures or by an analogous electronic device.

The transformer 2 has the primary winding Lp coupled with the first conduction terminal 6 so as to receive the input voltage Vin during the closed time Ton of the transistor 5.

The secondary winding Ls is associated with the output terminals $O_1$, $O_2$ through an output circuit comprising a rectifying diode D arranged in series with the secondary winding Ls and a capacitor C arranged in parallel with the output terminals $O_1$, $O_2$.

The transformer 2 also has an auxiliary winding $L_{AUX}$ coupled with a terminal at the reference voltage $V_{GND}$, and with the terminal opposite coupled, through the resistance $R_{ZCD}$, to a first terminal 11a of a control circuit 10A. The auxiliary winding $L_{AUX}$ replicates the voltage of the transformer 2 scaled by the ratio between the primary-auxiliary windings, basically therefore it replicates the voltage $V_{DS}$ that passes through the transistor 5.

The control circuit 10A generates the PWM control signal $V_{GD}$ to control the transistor 5.

The transistor 5, in turn, controls the transformer 2 in the periodic switching cycles Dn constantly feeding the load associated with the output terminals $O_1$, $O_2$ both in static operating conditions and in dynamic operating conditions in which there is a variation of the input voltage Vin and/or a variation of the load.

For each switching cycle Dn:
during the conduction of the transistor 5, i.e., in the closed time Ton, which in an embodiment takes place when the PWM control signal $V_{GD}$ is at a high logic value, the primary winding Lp is fed by the input voltage Vin and the transformer 2 stores electromagnetic energy;
during blocking of the transistor 5, i.e., in the open time Toff, when the PWM control signal $V_{GD}$ is brought to a low logic value, the secondary winding Ls, with the energy stored, feeds the output circuit and therefore the load generates a secondary demagnetization current Is and a recirculation signal, substantially defined by the voltage $V_{DS}$.

It can be observed that the open time Toff can be defined as the sum of a recirculation period $T_{DEM}$, discussed later in the description, and a delay time $T_{dK}$.

During the open time Toff, the transformer 2 generates the recirculation signal $V_{DS}$ that has a constant oscillation equal to a value (Vr+Vin) until the secondary demagnetization current Is goes to zero.

Thereafter, again in the open time Toff, due to the presence of the parasitic components in the switching regulator 1, the recirculation signal $V_{DS}$ takes on a damped oscillation comprising minimum local values alternating with maximum local values, i.e., valleys and peaks.

The damped oscillation of the recirculation signal $V_{DS}$ is worsened with an increase in the oscillation frequency and therefore with a reduction of the period of oscillation. Such a phenomenon is encountered in the case of a variation of the output load and/or a variation of the input voltage Vin.

In order to limit the frequency of the switching of the transistor 5, the control circuit 10A comprises a waiting block 20 suitable for generating a waiting time $T_{BLANK}$ during which the PWM control signal $V_{GD}$ is kept at a low logic value without generating any switching of the transistor 5 when dealing with a variation of the recirculation signal $V_{DS}$. In other words, during the waiting time $T_{BLANK}$, the variation of the recirculation signal $V_{DS}$ is ignored.

Therefore, the method for controlling the switching regulator 1A foresees to limit the switching frequency $f_{SW}$ of the transistor 5 by keeping the PWM control signal $V_{GD}$ constant, at the low logic value, for a time at least equal to the waiting time $T_{BLANK}$.

If the waiting time $T_{BLANK}$ is activated when the transistor 5 is interdicted, the control circuit 10A keeps the transistor 5 deactivated for a window F equal to the waiting time $T_{BLANK}$.

The switching frequency $f_{SW}$ of the transistor 5 also defines the switching frequency of the transformer 2 determining the switching cycles Dn and defining, for each switching cycle, an accumulation time Ton of the electromagnetic energy and an open time Toff with a recirculation of the electromagnetic energy accumulated.

The control method foresees to define and regulate the waiting time $T_{BLANK}$ dynamically for each switching cycle Dn of the transformer 2. In an initial step, at the first switching cycle D1, the method foresees to
define 50 an initial waiting time $T_{BLANK\_0}$ and assigned a first fixed value to said initial waiting time $T_{BLANK\_0}$;
activate said initial waiting time $T_{BLANK\_0}$ in interdicting the transistor 5, to determine a corresponding time window F;
detect the number K of valleys of the voltage $V_{DS}$ during the initial waiting time $T_{BLANK\_0}$.

The control method thus foresees to define the waiting time $T_{BLANK}$ in the second switching cycle $D_2$ by adding to the first fixed value a second variable value that is proportional to the number K of valleys detected during the first switching cycle $D_1$, step indicated with 55 in FIG. 8.

In this way, generalizing, the waiting time $T_{BLANK}$ of an $n^{th}$ switching cycle Dn is defined by a fixed component, i.e., the first value assigned (50) to the initial waiting time $T_{BLANK\_0}$, and by a variable component determined (60) by a second variable value that is proportional to the number K of valleys of the recirculation or voltage signal $V_{DS}$ detected in the waiting time $T_{BLANK}$ during the preceding switching cycle Dn−1.

An example of a function suitable for defining the waiting time $T_{BLANK}$ of a switching cycle Dn is:

$$T_{BLANK} = T_{BLANK\_0} + K * \Delta T_B$$

in which:

$T_{BLANK\_0}$ is the first value assigned to the initial waiting time;

$\Delta T_B$ is a "hysteresis" time and it is a value that ensures operation in a stable state for the switching regulator 1A with a predetermined number of valleys, as will become clearer in the rest of the description;

K is the number of valleys detected in the preceding switching cycle Dn−1.

Alternatively, the time window F having a duration equal to the waiting time $T_{BLANK}$ could be activated, per each switching cycle Dn, at the same time as the activation of the transistor 5.

The step of detecting the number K of valleys of the voltage $V_{DS}$ during the waiting time $T_{BLANK}$ included in the open time Toff, comprises:

generating (61) a trigger signal Trigger when the detected voltage $V_{AUX}$ at the auxiliary winding $L_{AUX}$ of the transformer 2, on the negative-going edge, is less than a trigger value $V_{ZCDtrig}$, defining (62) the number K of valleys by counting said impulses of the trigger signal Trigger during the window F; i.e., the waiting time $T_{BLANK}$.

The control method thus foresees to:

activate (63) the transistor 5 upon detection of an impulse of the trigger signal Trigger detected after the waiting time $T_{BLANK}$;

define the waiting time $T_{BLANK}$ for the subsequent switching cycle $D_{n+1}$ of the transformer 2 through the formula $T_{BLANK} = T_{BLANK\_0} + K * \Delta T_B$ using the defined number K of the valleys counted.

The method foresees to use a counting block 25 that, in an embodiment, is activated when the transistor 5 is interdicted.

Preferably, the number K of valleys detected is stored in storage means, such as a buffer or memory, until the next rising edge of the PWM control signal $V_{GD}$, and after a suitable delay, the counting block 25 goes to zero.

A maximum number Kmax of valleys can be predefined, so as to prevent a subsequent valley from being counted.

According to an embodiment, the control method foresees to assign to the hysteresis time $\Delta T_B$ a value comprised within a range $[\Delta T_{DEM} - T_R]$ that ensures stable operation on a predetermined valley during the damped oscillation step of the voltage $V_{DS}$ which has the period of oscillation $T_R$.

The control circuit 10A, in the embodiment shown in FIG. 9A, is coupled with the first input terminal 11a to the auxiliary winding $L_{AUX}$ of the transformer 2, with a second input terminal 11b to one of the output terminals $O_1$ and with an output terminal 11c to the control terminal 8 of the transistor 5.

The implementation of the control circuit 10A, shown in FIG. 9A, comprises the detecting block 12 coupled through the first input terminal 11a to the auxiliary winding $L_{AUX}$, through a resistance $R_{ZCD}$, to generate a signal $V_{ZCD}$ representative of the signal $V_{DS}$ and capable of highlighting the demagnetization of the transformer 2.

The detecting block 12 is a ZCD circuit which detects the demagnetization of the transformer 2 and emits the trigger signal Trigger to an output terminal, when the signal $V_{ZCD}$ goes below the trigger value $V_{ZCDtrig}$.

In particular, a square wave arming signal ARM is generated from the signal $V_{ZCD}$, which is brought to a high logic value when, at the rising edge, the signal $V_{ZCD}$ goes above a first threshold $V_{ZCDarm}$ and takes up a low logic value when, on the descending edge, the signal $V_{ZCD}$ goes below the trigger value $V_{ZCDtrig}$.

A waiting block 20 is coupled with a first input terminal 21 to the output terminal of the detecting block 12 and with an output terminal 24 to a set (S) terminal of a Latch 15 through the interposition of an AND logic gate 13 and of an OR logic gate 14. The waiting block 20 is coupled with a second input terminal 22 to an output terminal of the latch 15 and is coupled with a third input terminal 23 to a reference control voltage $V_{CSref}$ of the circuit.

The AND gate 13 is coupled with a second input terminal to the output terminal of the detecting block 12, whereas the OR 14 gate is coupled with a second input terminal to an output terminal of a start block 17, which is associated with an input terminal to the output terminal of the latch 15.

A comparing block 18 has a first inverting input terminal connected to the reference control voltage $V_{CSref}$ and a second input terminal connected to an actual voltage $V_{cs}$ detected at a sense resistance Rs, which is arranged between the second controlled terminal 7 of the transistor 5 and the reference voltage $V_{GND}$. The comparing block 18 has an output terminal coupled to a reset input R of the latch 15.

The latch 15 is coupled with the output terminal to an input terminal of a control block 16 the output terminal of which defines the output terminal 11c of the control circuit 10A. An isolated feedback block 19 is coupled to the second input terminal 11b of the control circuit 10A and with an output terminal to the reference control voltage $V_{CSref}$. The isolated feedback block 19 isolates the output of the regulator 1A from the control circuit 10A while generating a current signal $I_{FB}$ from the comparison between a portion of the output voltage Vout of the switching regulator 1A with a voltage reference Vref, of predetermined value. The difference between the two voltage values generates an error signal that is suitably amplified and converted into the current signal $I_{FB}$. The current signal $I_{FB}$, detected at the pin FB, internally generates the reference control voltage $V_{CSref}$ through the potential difference at an internal resistance connected between the inverting input 18 and an internal feed bus.

Figure 9B:
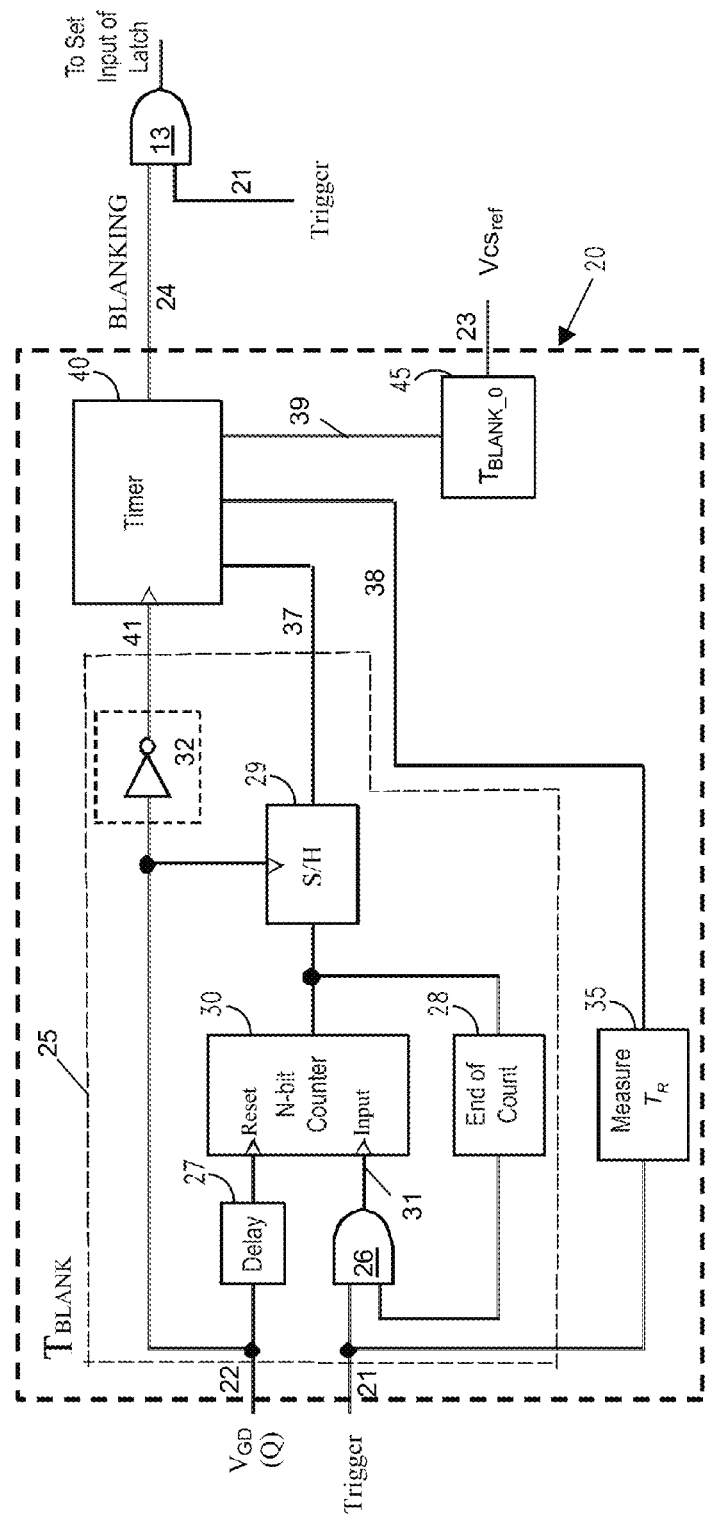
FIG. 9B shows a block diagram that shows an implementation of a control circuit of a flyback switching regulator such as that of FIG. 9A made according to an embodiment.

According to an embodiment shown in FIG. 9B, the waiting block 20 has a counting block 25 coupled to the first input terminal 21 and to the second input terminal 22 of the waiting block 20. Said counting block 25 is suitable for storing the number K of local minimum values detected in the recirculation signal $V_{DS}$ during a switching cycle Dn of the transformer 2.

An adding block 40 is coupled with a first input terminal 37 to the output of the counting block 25, with a second input terminal 38 it is coupled to the output of a measuring block 35 and with a third input terminal 39 it is coupled to the output of an initial waiting block 45. The adding block 40 is coupled in output to the output terminal 24 of the waiting block 20.

The measuring block 35 has the input coupled to the first input terminal 21 of the waiting block 20 and it is suitable for detecting the period of oscillation $T_R$ in said recirculation signal $V_{DS}$. According to an embodiment, the period of oscillation $T_R$ is calculated as the time range between two successive impulses of said trigger signal Trigger.

The initial waiting block 45 is coupled in input to the third input terminal 23.

The counting block 25 comprises a counter 30 with N-bit with a first input 31 coupled to the first input terminal 21 of the waiting block 20 through a second AND gate 26 to receive the impulses of the trigger signal trigger from the detecting block 12.

An end of counting block 28 is coupled with an input terminal to an output terminal of the counter 30 and with the output terminal to the second AND gate 26. The end of counting block 28 has a predetermined maximum value of K.

A sample/hold block 29 is coupled between the output terminal of the counter 30 and the first input terminal 37 of the adding block 40 and has an inverting input coupled to the second input terminal 22 of the waiting block 20.

An inverting block 32 is coupled between the second input terminal 22 of the waiting block 20 and a fourth input terminal 41 of the adding block 40.

In the embodiment shown in FIG. 9B, the fourth input terminal 41 is an inverting input and it is coupled through an inverting block 32 to the second input terminal 22. As is clear to a man skilled in the art, the inverting block 32 is present in the case in which the time window F having a duration equal to the waiting time $T_{BLANK}$ is activated, for each switching cycle Dn, at the same time as the transistor 5 is switched off. In the case in which the time window F is activated, for each switching cycle Dn, at the same time as the activation of the transistor 5, the inverting block 32 is absent.

Figure 2:
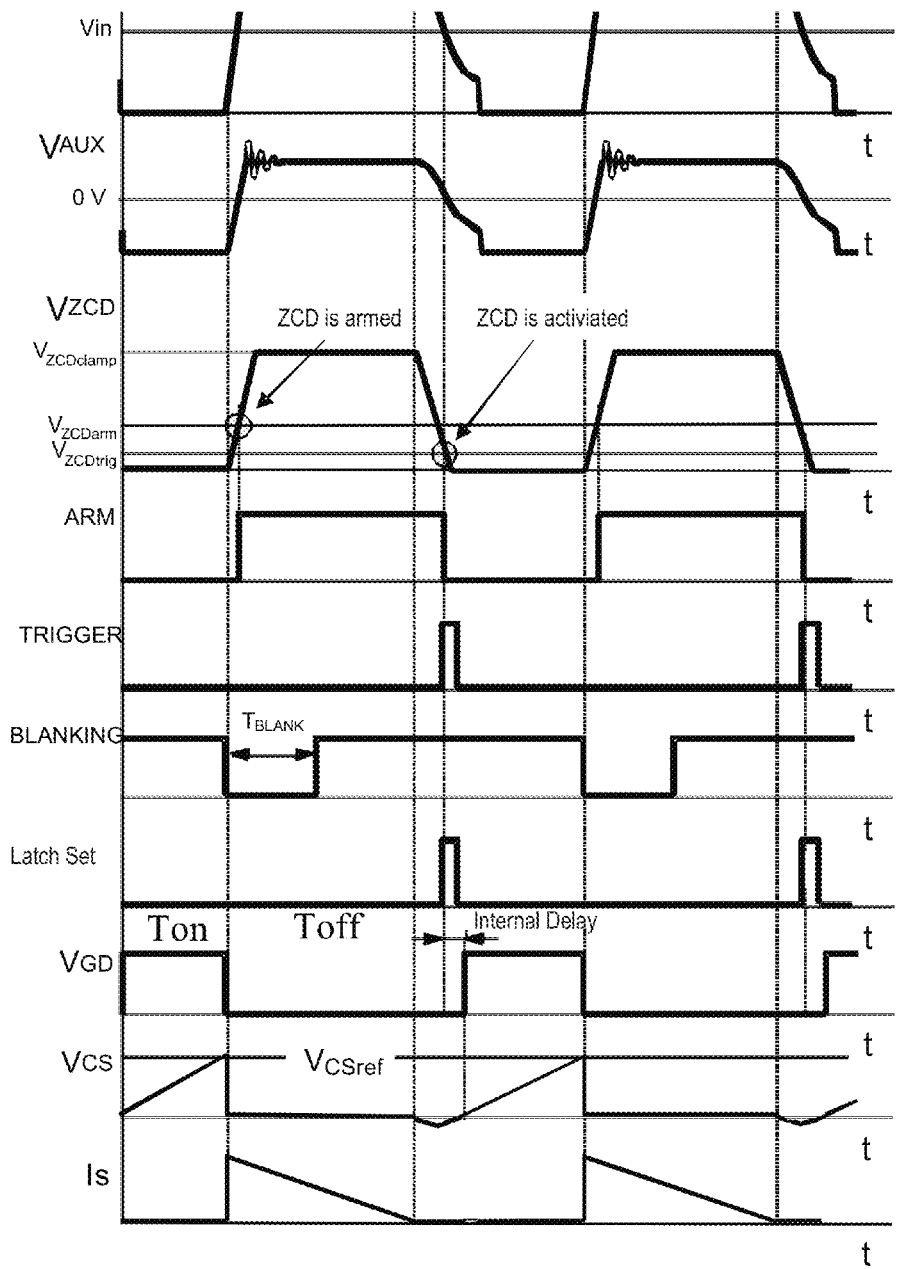
Figure 3:
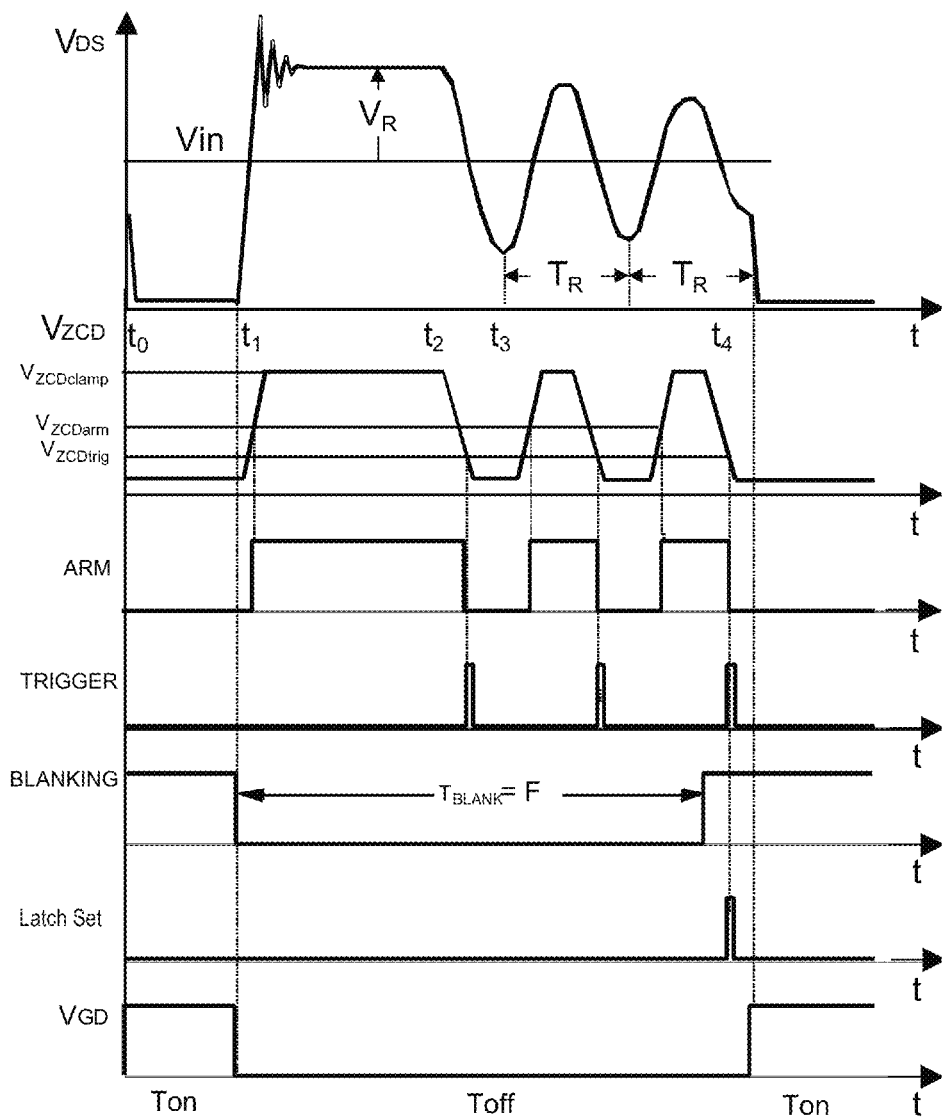
FIG. 3 shows waveforms relative to the regulator of FIG. 1 during valley-skipping operation.

For the operation of the switching regulator 1A we also refer to the waveforms shown in FIGS. 2 and 3.

At time $t_0$ the PWM control signal $V_{GD}$ is at a high value and the transistor 5 conducts and the primary winding Lp is fed by the input voltage Vin. Between the time $t_0$ and the time $t_1$ electromagnetic energy is stored in the primary winding Lp of the transformer 2.

At time $t_1$ the PWM control signal $V_{GD}$ becomes substantially equal to zero and the transistor 5 is brought into a interdicted state. From time $t_1$ the energy stored in the primary winding Lp is transferred to the secondary winding Ls and this generates the secondary demagnetization current Is that feeds the output circuit and the load. At time $t_2$ the secondary demagnetization current Is substantially goes to zero.

However, following the parasitic components, the voltage or recirculation signal $V_{DS}$ from time $t_2$ has a damped oscillation comprising valleys and peaks. The first valley appears at time $t_3$. This should make the transistor 5 conduct again, but the waiting time $T_{BLANK}$ that is activated at time $t_1$ prevents any impulse of the trigger signal Trigger generated by the detecting block 12 up to time $t_4$ that determines the moment at which it is possible to make the transistor 5 conduct again.

Therefore, the waiting time $T_{BLANK}$ defines the width of the window F in which the transistor 5 stays securely interdicted during the open time Toff, keeping the PWM control signal $V_{GD}$ constant. When there is the first local minimum of the voltage $V_{DS}$, after the waiting time $T_{BLANK}$, the transistor 5 is driven in conduction status again and new energy is stored in the primary winding Lp of the transformer 2 which starts a subsequent switching cycle Dn.

In accordance with one embodiment, the control circuit 10A, through the waiting block 20, dynamically controls the transistor 5, dynamically calculating the waiting time $T_{BLANK}$ for each switching cycle Dn of the transformer 2, as a function of the number K of local minimums of the voltage $V_{DS}$ of the preceding switching cycle Dn−1. This makes it possible to reduce the switching power losses by increasing the efficiency of the regulator.

An embodiment also makes it possible to define the range of admissible values to be assigned to the hysteresis time $\Delta T_B$, to ensure stability in the operation of the switching regulator 1A during the oscillation step in the open time Toff of demagnetization of the transformer.

Figure 10:
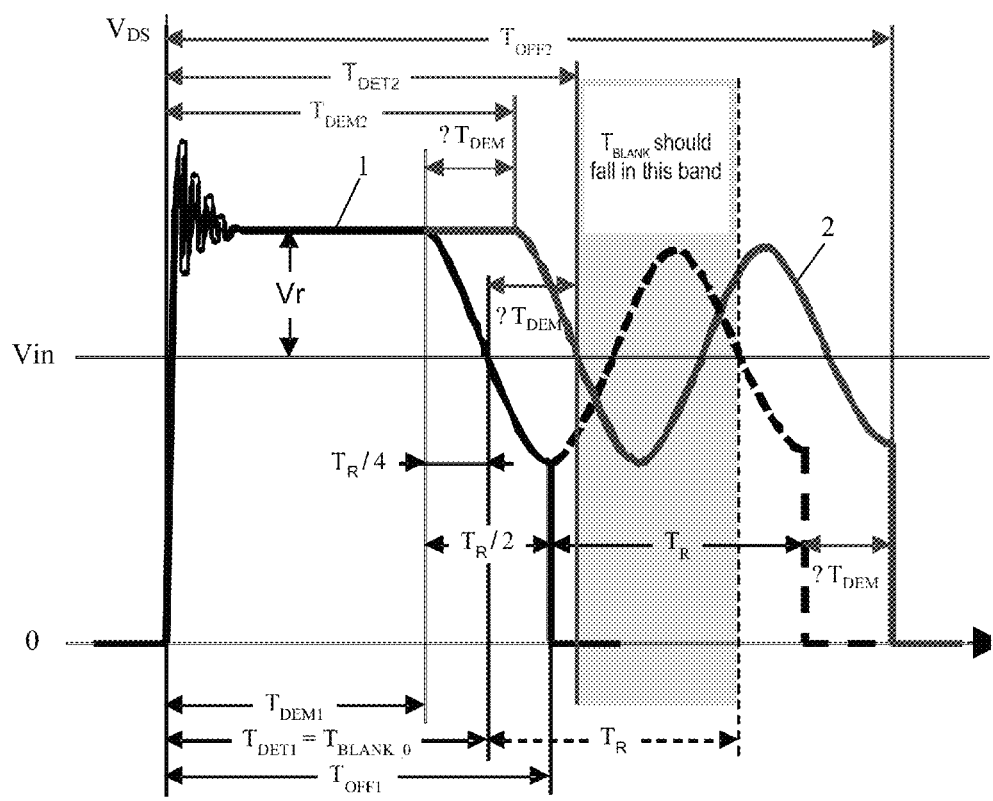
FIG. 10 shows some details of two different waveforms of the voltage $V_{DS}$ of the control circuit of FIG. 9B.

With reference to the waveforms of FIG. 10, the waveform that refers to the case in which the transistor 5 is interdicted, in the open time Toff at time T equal to $t_0=0$ is indicated with 1. Let us assume that at the same time $t_0$ the waiting time $T_{BLANK}$ is activated. The voltage $V_{DS}$ will begin to rise, at a time $T_{DEM1}$ there will be the complete demagnetization of the transformer 2, which corresponds to bringing the secondary demagnetization current Is to zero.

At time $T_{DET1}$ equal to $T_{DEM1}+T_R/4$, where $T_R$ is the period of oscillation of the voltage $V_{DS}$, the detected voltage $V_{AUX}$ at the auxiliary winding $L_{AUX}$ goes to zero, and the control circuit 10A, through the detecting block 12, generates a Trigger impulse.

In the present example, the time $T_{DET1}$ corresponds to the initial waiting time $T_{BLANK\_0}$ and the transistor 5 is driven in conduction status at time $T_{OFF1}=T_{DEM1}+T_R/2$.

The waveform 80 in a broken line represents the waveform of the voltage $V_{DS}$ with an infinitesimal reduction of the output load, in which case the conduction of the transistor 5 is controlled at the second valley.

The accumulation time Ton of the transformer 2 and the demagnetization time $T_{DEM1}$ stay substantially unchanged with respect to the preceding case in which the switching takes place at the first valley, but the transistor 5 is driven in conduction status at time $T=T_{DEM1}+3T_R/2$.

As a consequence of this, the switching frequency $f_{SW}$ of the transistor 5 reduces for the same power transferred in output.

Remembering that in a QR flyback converter the power is equal to:

$$P_t = \frac{1}{2} * Lp * I_p^2 * f_{SW}.$$

A reduction of the switching frequency $f_{SW}$ leads to an increase of the peak current in the primary winding Lp of the transformer 2.

The accumulation time Ton in which there is magnetization of the transformer 2 increases and therefore, in a proportional manner the demagnetization time also lengthens. From the power formula indicated above, the balancing of the power will be obtained after a few switching cycles Dn with a demagnetization time $T_{DEM2} > T_{DEM1}$ and a time $T_{DET2} = T_{DEM2} + T_R/4$.

The waveform 82 represents the voltage $V_{DS}$ in stationary operation with the transistor 5 driven in conduction status at the second valley.

Suitably, by ensuring that the first zero crossing of the detected voltage $V_{AUX}$ (i.e., with the voltage $V_{DS}$ equal to the input voltage Vin) and therefore the first impulse of the trigger signal Trigger are contained in the new waiting time $T_{BLANK}$, calculated dynamically, the transistor 5 is preventing from going back to conducting in the first valley.

The subsequent Trigger impulse takes place at $t=T_{DEM2}+5T_R/4$ and, consequently, the transistor 5 is driven in conduction status at time $t=T_{DEM2}+3T_R/2$.

Therefore, the following applies: $T_{DET2}=T_{DEM2}+T_R/4 < T_{BLANK}$.

There is also an upper limit for the new $T_{BLANK}$. If in the switching cycle $D_n$ it goes from switching on at the first valley to switching on at the second valley, in the next switching cycle $D_{n+1}$ of the transformer 2, the accumulation time Ton and the open time Toff of the transformer 2 are similar or comparable to those of the preceding switching cycle $D_n$, since the control cycle of the control circuit 10A takes a certain time to respond. In this case, if the second passage by Vin of the voltage $V_{DS}$ and the corresponding impulse of the trigger signal Trigger take place in the new waiting time $T_{BLANK}$. This will lead to an increase in the waiting time $T_{BLANK}$ in the switching cycle $D_{n+2}$ and consequently the counting of the number K of valley increases until it reaches the maximum value Kmax assigned.

However, to respect the condition of the waiting time $T_{BLANK}$, $$T_{BLANK} < T_{DET1} + T_R,$$

the waiting time $T_{BLANK}$ will be comprised in:

$$T_{DET2} < T_{BLANK} < T_{DET1} + T_R, \quad (2)$$

which leads to a interdicted condition for the oscillation step that can be rewritten as:

$$T_{DEM2} + T_R/4 < T_{BLANK} < T_{DEM1} + 5T_R/4.$$

Given that $T_{BLANK} = T_{BLANK\_0} + \Delta T_B$, and that $T_{BLANK\_0} = T_{DEM1} + T_R/4$, therefore:

$$T_{DEM2} + T_R/4 < T_{DEM1} + T_R/4 + \Delta T_B < T_{DEM1} + 5T_R/4.$$

$$T_{DEM2} < T_{DEM1} + \Delta T_B < T_{DEM1} + T_R.$$

Defining $\Delta T_{DEM} = T_{DEM2} - T_{DEM1}$ it is possible to obtain:

$$\Delta T_{DEM} < \Delta T_B < T_R \quad (3)$$

that basically defines a permitted bandwidth indicated in grey in FIG. 10.

It is possible to see how the maximum variation of $\Delta T_{DEM}$ is in the passage from switching on the first valley to that on the second valley. Indeed, the ratio between the period of oscillation $T_R$ and the open time Toff of the oscillation step of the voltage $V_{DS}$ reduces as the number K of valleys that are skipped increases.

The Applicant has been able to note how, from an analysis of QR flyback converters (we refer to document AN1326 published on the website of STMicroelectronics), the demagnetization times $T_{DEM1}$ and $T_{DEM2}$ can be expressed as:

$$T_{DEM1} = \frac{1}{2(1+M)f_T}\left[1 + \sqrt{1 + 2f_T T_R}\right] = T_{BLANK_0} - \frac{T_R}{4}, \quad (4)$$

$$T_{DEM2} = \frac{1}{2(1+M)f_T}\left[1 + \sqrt{1 + 6f_T T_R}\right], \quad (5)$$

Where M=Vr/Vin, and $$f_T = \frac{V_r^2}{2(1+M)^2 L_p P_t}$$

is the so-called transition frequency, i.e., that at which the converter would work exactly between the continuous and discontinuous conducting mode, whereas the power $P_t$ is that corresponding to the passage between a switching on the first and that on the second valley. Therefore:

$$\Delta T_{DEM} = \frac{1}{2(1+M)f_T}\left(\sqrt{1 + 6f_T T_R} - \sqrt{1 + 2f_T T_R}\right) \quad (6)$$

Figure 11A:
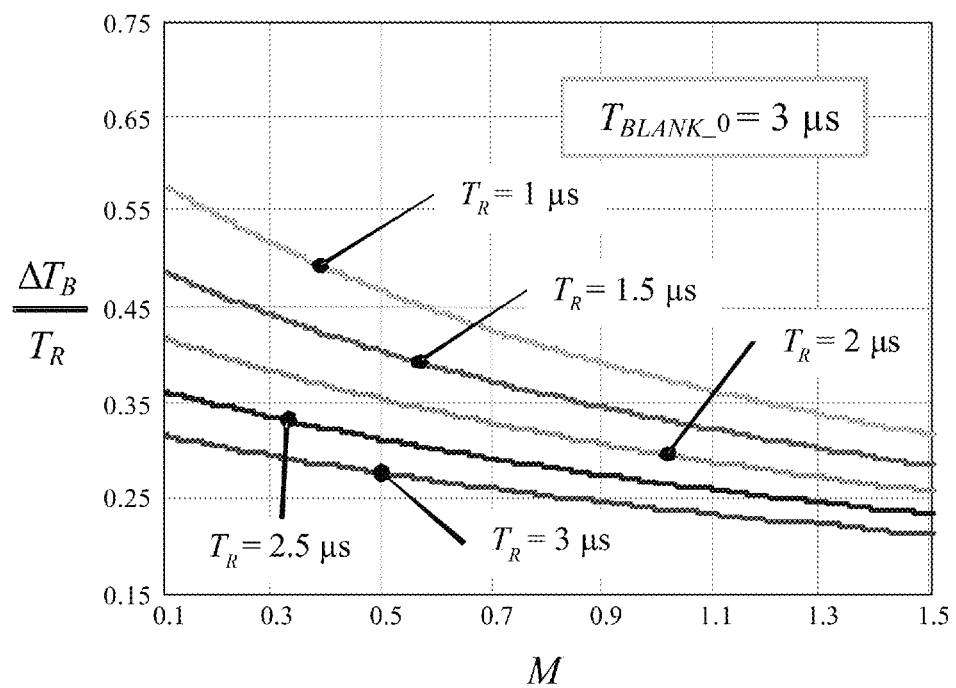
FIGS. 11a-c respectively show five different waveforms relative to the control circuit of FIG. 9B.
Figure 11B:
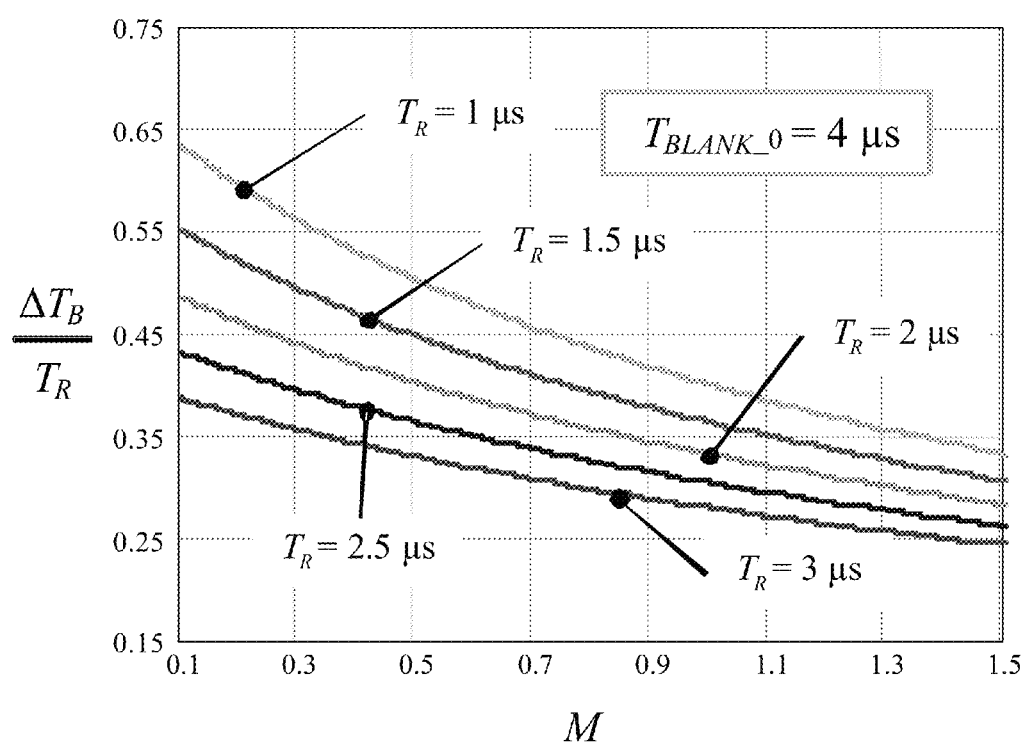
Figure 11C:
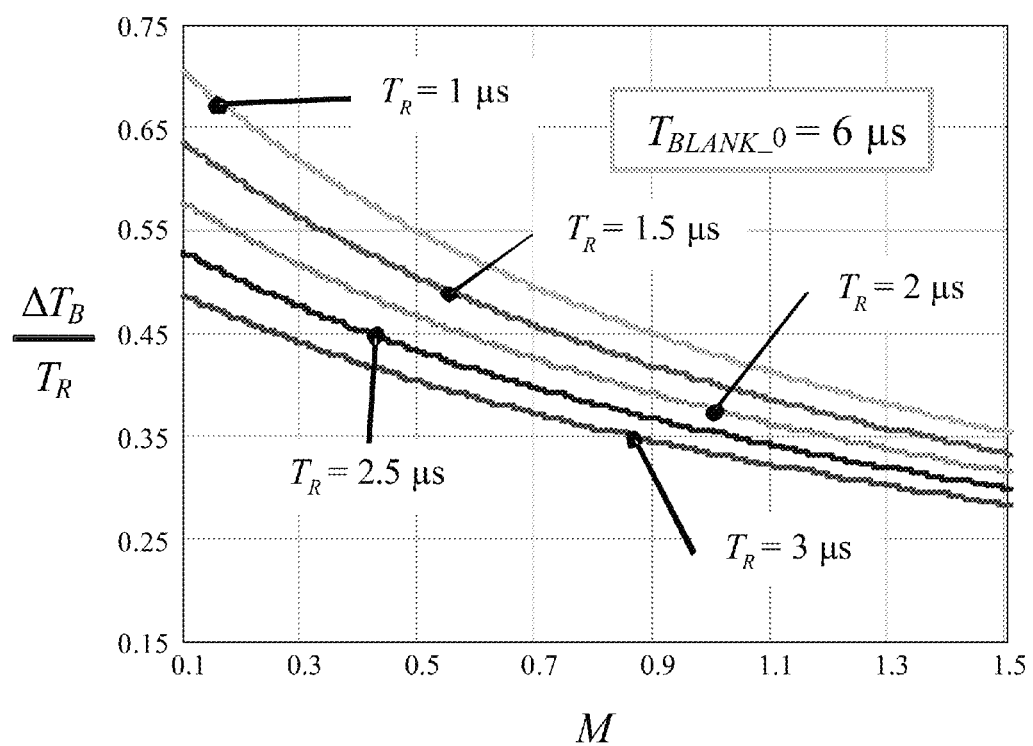

Solving the relationship (4) as a function of $f_T$ and replacing such a value in the relationship (6) it is possible to obtain $\Delta T_{DEM}$ as a function of $T_R$ and of the initial waiting time $T_{BLANK\_0}$ that are shown in the graph of FIGS. 11a-11c in which the ratio $\Delta T_B/T_R$ is represented as a function of M for different values of $T_R$ and $T_{BLANK\_0}$.

The ratio M is comprised between (0.11-1.5) and it was defined considering: $V_R$ comprised between the values 50-150V, Vin comprised between 100-450V and the period of oscillation $T_R$ comprised between 1 μs and 3 μs, which makes it possible to cover all practical applications supplied by the public energy distribution network.

It has been possible to see how for values of the waiting time $T_{BLANK}$ that do not exceed 6 μs with a time $T_R$ of no less than 1 μs the hysteresis time $\Delta T_B$ comprised in the range $\frac{3}{4}*T_R < \Delta T_B < T_R$ ensures stable operation in the valley skipping condition of the switching regulator 1A at the damped sinusoidal oscillation of the open time Toff during demagnetization, making it possible to prevent the valley jump phenomenon in all practical operating conditions.

Advantageously, the waiting time $T_{BLANK}$ can be activated both as indicated in the preceding description at the start of the recirculation time Toff that coincides with the interdicting of the transistor 5, and at the start of the accumulation time Ton of the primary winding Lp that coincides with the conduction of the transistor 5.

In this last case, in which the waiting time $T_{BLANK}$ is activated with the activation of the accumulation time Ton of the transformer 2, the "valley block" condition expressed by the relationship (2) indicated above remains usable. It is worth remembering that the initial waiting time $T_{BLANK\_0}$ equals the minimum switching period $T_{SW\_min}$ permitted, or in other words the maximum frequency permitted is equal to $1/T_{BLANK\_0}$.

Figure 12:
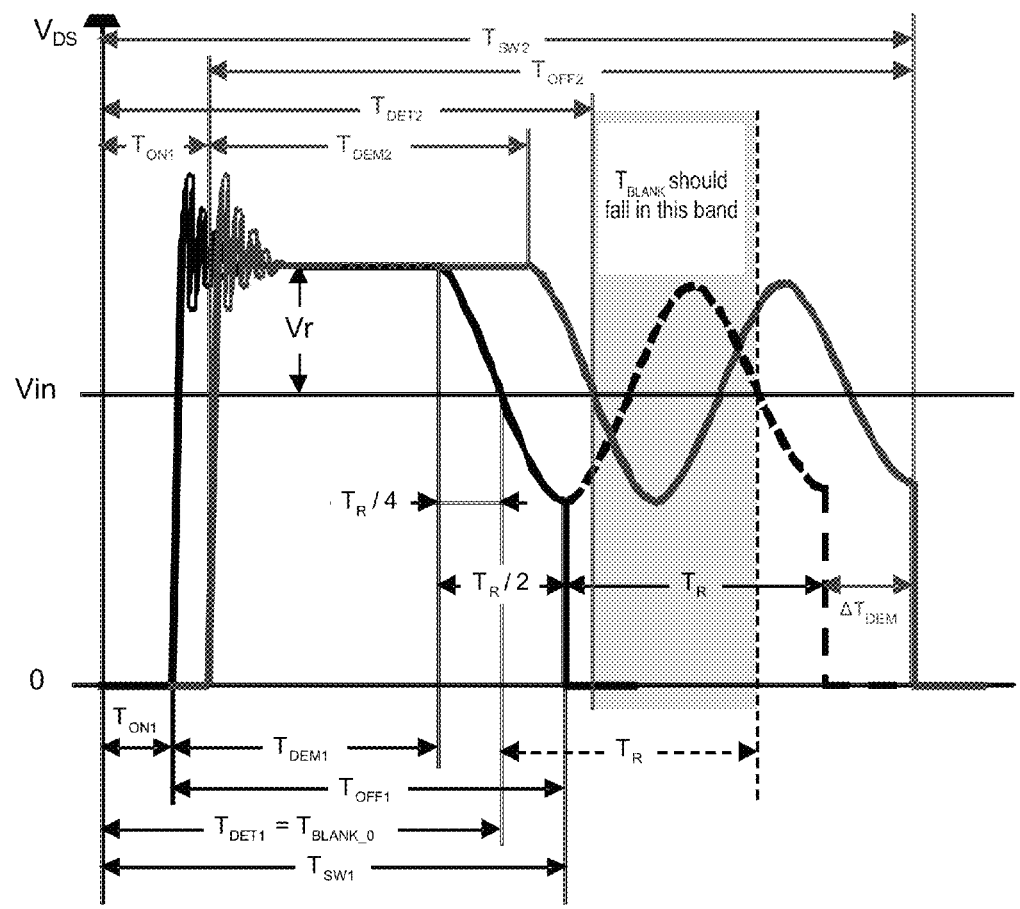
FIG. 12 shows some details of the voltage $V_{DS}$ for determining the waiting time $T_{BLANK}$ of the circuit of FIG. 9B.

With reference to the time diagram shown in FIG. 12, it is possible to deduce that the hysteresis time $\Delta T_B$ is contained within the range $\Delta T_{SW} - T_R < \Delta T_B < T_R$.

In which $\Delta T_{SW}$ is the variation of the switching frequency resulting from the skipping of the first valley of the voltage $V_{GD}$ that defines its permitted "bandwidth", highlighted in grey in FIG. 12.

Through an analysis analogous to that carried out above to formulate the expression (6), it is possible to obtain in the present case that:

$$\Delta T_{SW} = \frac{1}{2f_T}\left(2f_T T_R \sqrt{1 + 6f_T T_R} - \sqrt{1 + 2f_T T_R}\right), \quad (7)$$

and $$\Delta T_{SW} - T_R = \frac{1}{2f_T}\left(\sqrt{1 + 6f_T T_R} - \sqrt{1 + 2f_T T_R}\right),$$

Figure 13:
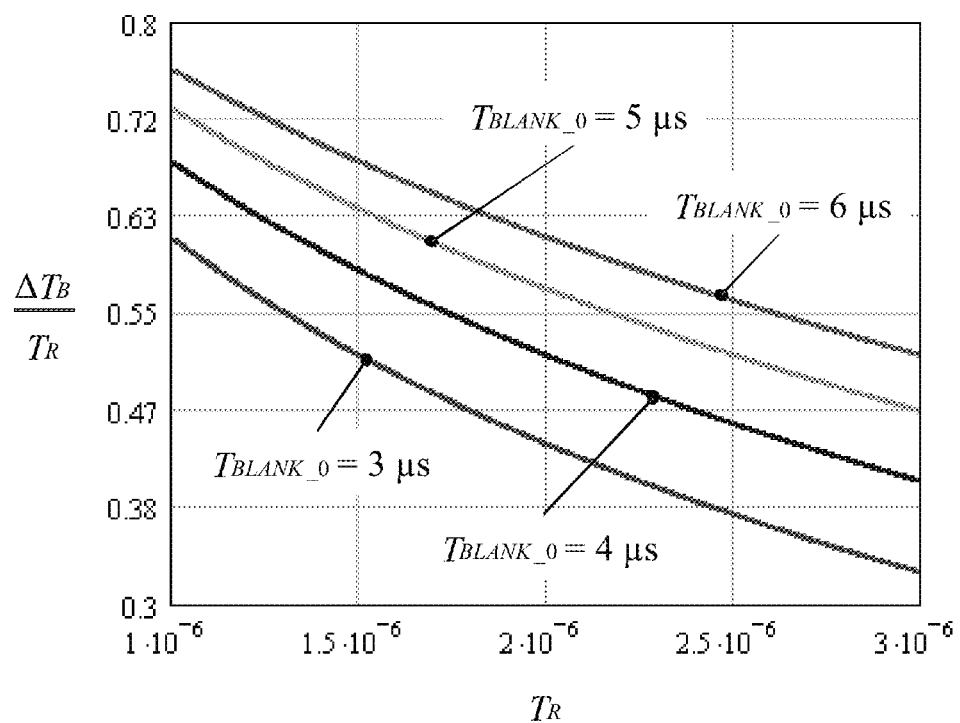
FIG. 13 shows, with respect to the circuit of FIG. 9B, some oscillations of the waveform of the waiting time $T_{BLANK}$ as a function of the value of the period of oscillation $T_R$.

It is possible to note that the minimum limit of the hysteresis time $\Delta T_B$ does not depend on the ratio M. As shown in FIGS. 13a-13c it is possible to express the ratio $\Delta T_B/T_R$ as a function of $T_R$ for different values of the initial waiting time $T_{BLANK\_0}$.

From an analysis of such graphs it is possible to conclude that for a hysteresis time $\Delta T_B$ comprised in the range:

$$\frac{4}{5}T_R < \Delta T_B < T_R$$

which is defined for values of the initial waiting time $T_{BLANK\_0}$ not greater than 6 μs, and for values of the period of oscillation $T_R$ not less than 1 μs, stable operation is ensured, i.e., the absence of valley jump phenomena, under all practical operating conditions.

Figure 4A:
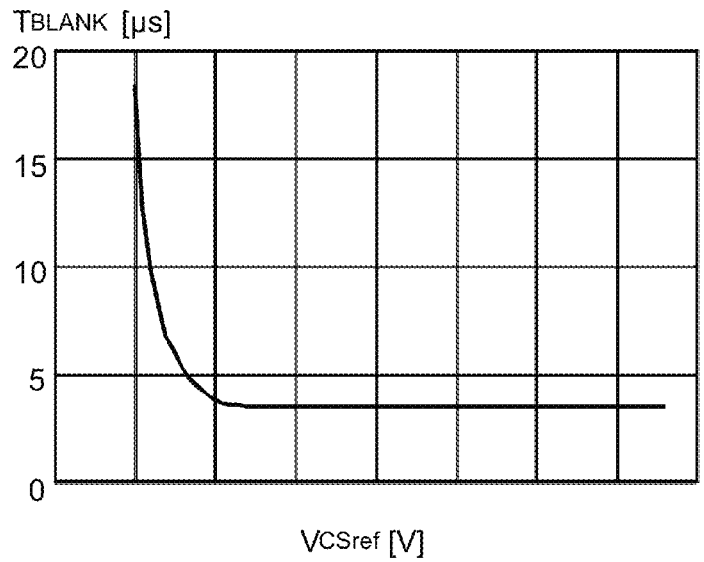
FIGS. 4a and 4b respectively show a diagram relative to the regulator of FIG. 1, showing the oscillation of the waiting time $T_{Blank}$ as a function of the control voltage $V_{CSref}$ and a diagram that shows the oscillation of the switching frequency as a function of the input power.
Figure 4B:
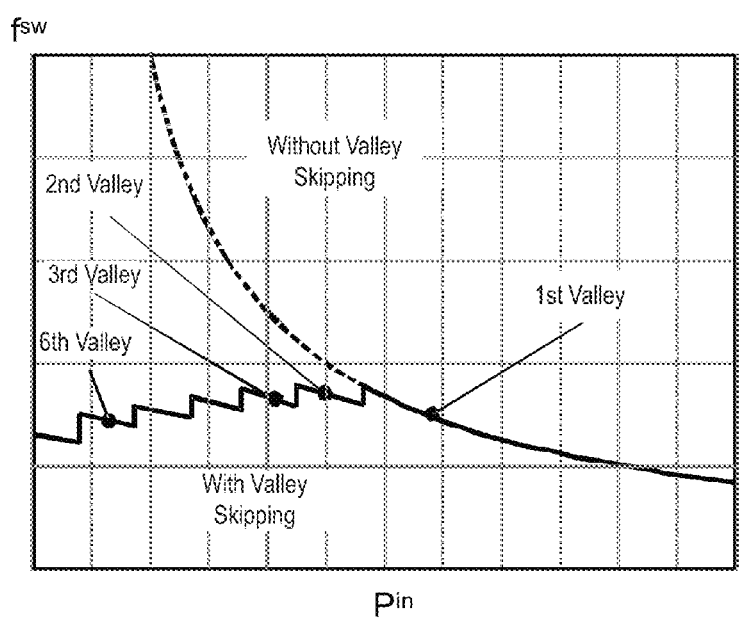
Figure 5:
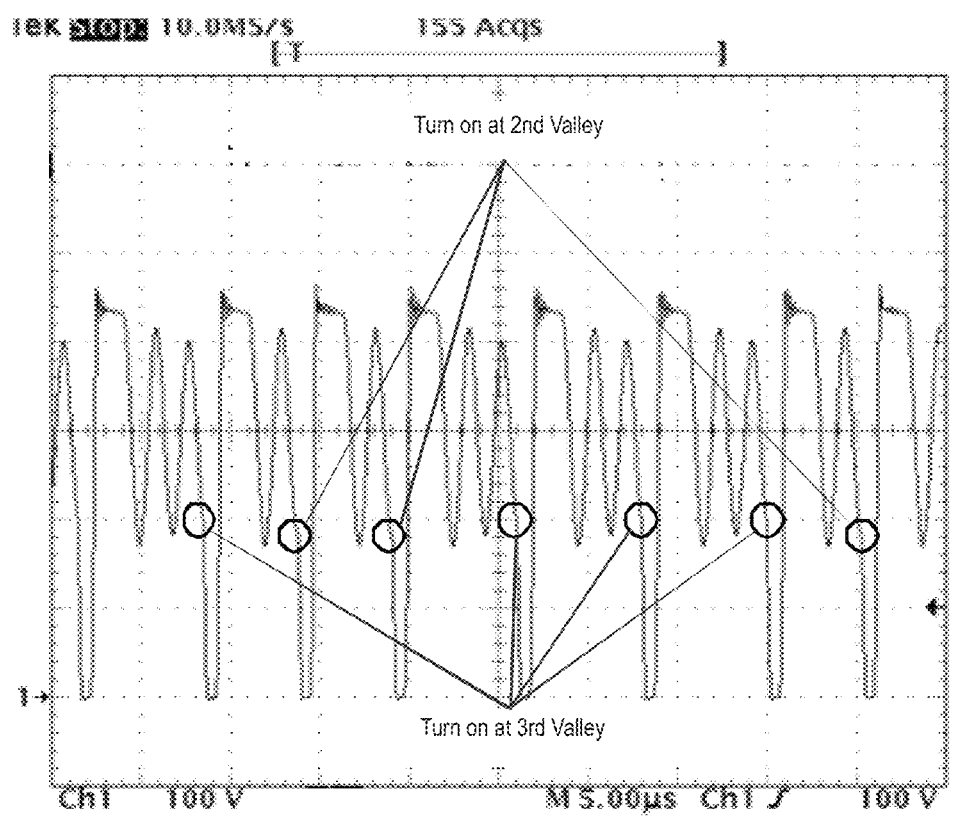
FIG. 5 shows the valley jump phenomenon during valley skipping operation in a switching regulator, according to known art.
Figure 6:
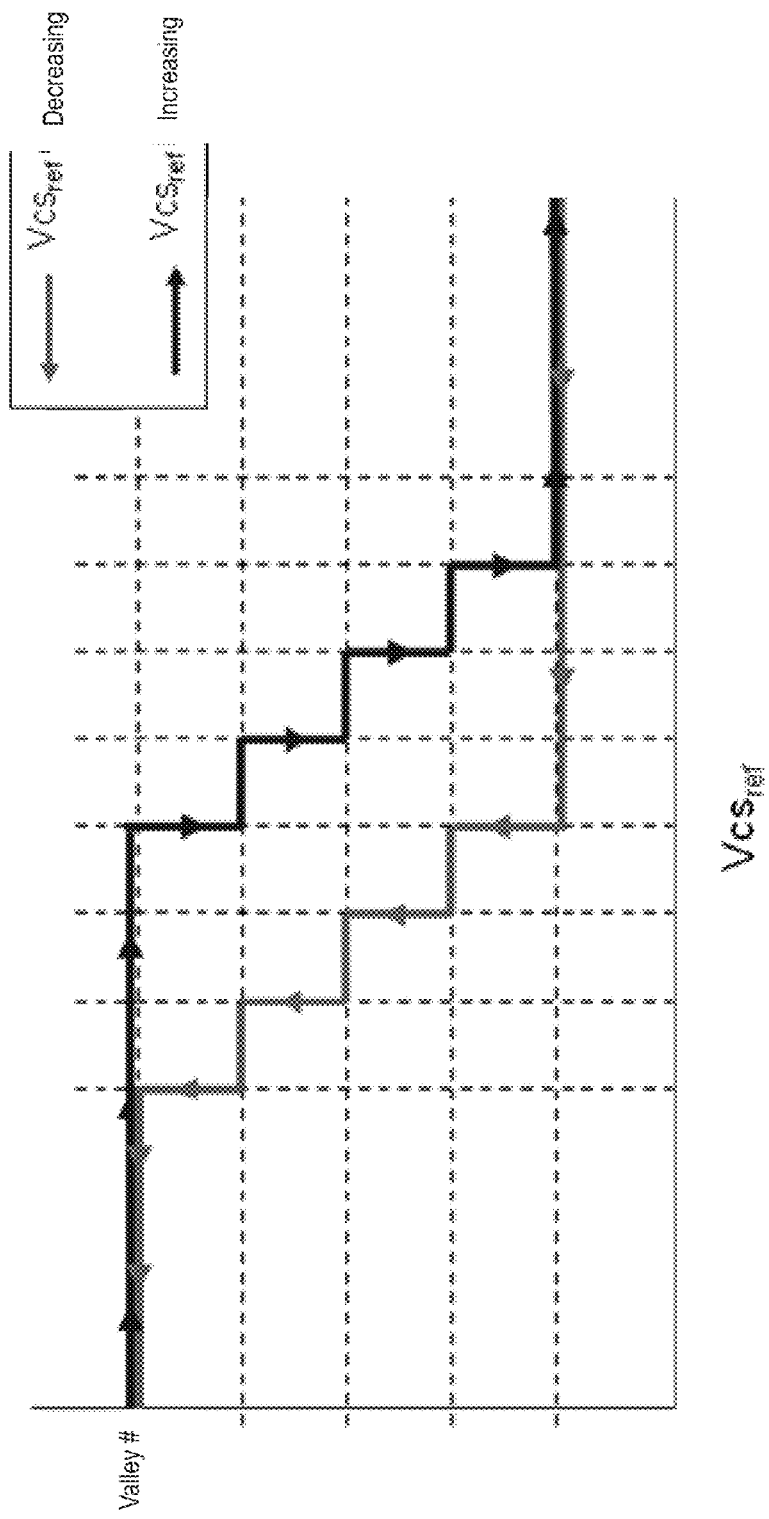
FIGS. 6 and 7 show two different operating schemes of control circuits made according to the prior art.
Figure 7:
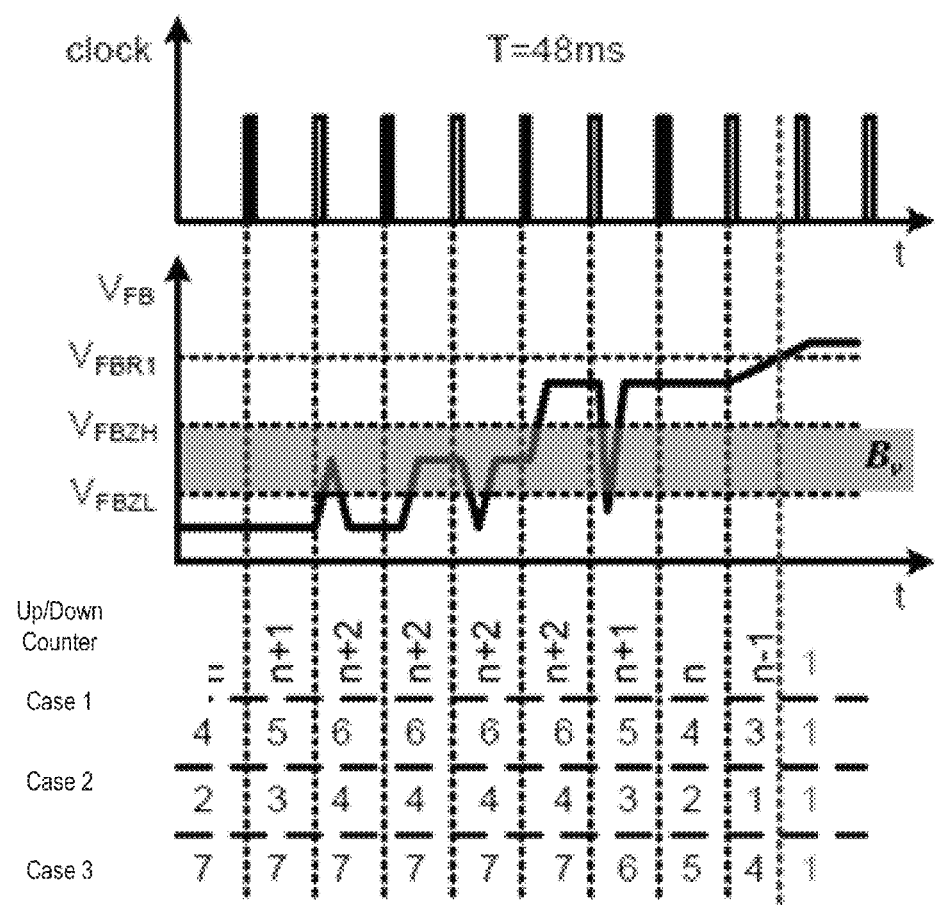

Preferably, the first value assigned to the initial waiting time $T_{BLANK\_0}$ is a value that is a function of the reference control voltage $V_{CSref}$, with an analogous oscillation to that indicated in FIG. 4a, increasing with the reduction of the waiting time $T_{BLANK}$.

Advantageously, a semiconductor device suitable for generating a switching regulator can comprise the control circuit 10A and the switch 5 integrated in a single substrate or incorporated in a single package.

In particular, the method and control circuit, according to the present disclosure, make it possible to reduce switching losses, as compared to regulators of the known art.

Moreover, the method and the control circuit make it possible to avoid valley jump phenomena and, consequently, the noise created by the mechanical vibrations of the magnetic components, defining dynamically and for each switching cycle of the transformer, the waiting time in which to calculate the minimum local values of the recirculation signal, in an efficient and functional manner.

Moreover, the control circuit can be implemented in a compact form.

Of course, a person of skill in the art can bring numerous modifications and variants to the configurations described above, in order to satisfy contingent and specific requirements, all of which are in any case covered by the scope of of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a switching regulator, comprising:
defining a first waiting time during which a switching control signal of the switching regulator is ignored and a switch of the switching regulator is interdicted, by adding a first fixed value and a first variable value;
detecting a number of valleys occurring in a recirculation signal of the switching regulator during said first waiting time;
assigning a second fixed value to a second waiting time determining a second variable value that is proportional to the number of valleys detected during the first waiting time of a first switching cycle; and
defining the second waiting time by adding to said second fixed value said second variable value.

2. The method according to claim 1, wherein said second waiting time is calculated according to the function:

$$TBlank = TBlank\_0 + K*\Delta TB$$

in which:
TBlank is the second waiting time;
TBlank_0 is the second fixed value of said second waiting time;
$\Delta TB$ is a hysteresis time;
K is the number of valleys detected during the first waiting time; and
$K*\Delta TB$ is the second variable value.

3. The method according to claim 1, comprising:
assigning an initial fixed value as an initial waiting time;
detecting a number of valleys occurring in the recirculation signal of the switching regulator during said initial waiting time; and
determining the first variable as a value that is proportional to the number of valleys detected during the initial waiting time of an initial switching cycle, immediately preceding the first switching cycle.

4. The method according to claim 1, wherein said first waiting time is started upon either an opening or a closing of said switch.

5. The method according to claim 1, wherein assigning the second fixed value comprises determining the second fixed value as a function of a value, during the first switching cycle, of a control voltage that varies in direct relation to variation of a load applied to the switching regulator.

6. The method according to claim 2, wherein detecting said number K comprises:
generating a trigger signal when a detected voltage that is proportional to said recirculation signal is below a trigger threshold;
counting impulses generated by said trigger signal during said first waiting time, said number K being equal to the number of impulses counted.

7. The method according to claim 2, wherein said hysteresis time corresponds to a time interval from $\Delta T_{DEM}$ to $T_R$, where $\Delta T_{DEM}$ is calculated as a difference between a first demagnetization time in said first switching cycle and a second demagnetization time in said first switching cycle, and in which $T_R$ is a period of oscillation of said recirculation signal.

8. The method according to claim 3, wherein said first fixed value is equal to said initial waiting time.

9. The method according to claim 6, comprising:
closing the switch in response to detecting a next impulse of the trigger signal after said first waiting time; and
closing the switch in response to detecting a next impulse of the trigger signal after said second waiting time.

10. A control circuit for a switching regulator having a switch, said control circuit comprising:
a blocking circuit configured to keep the switch open by blocking a trigger signal that is configured to control the switch; and
a waiting block configured to output to the blocking circuit a blanking signal configured to cause the blocking circuit to block the trigger signal for a variable waiting time, the waiting block including:
a counting block configured to detect and store a number of valleys in a recirculation signal of the switching regulator during the waiting time of each switching cycle of the switching regulator; and
an adding block configured to define said waiting time for each switching cycle of said switching regulator by adding to a fixed value, a variable value proportional to said number of valleys detected by said counting block during a waiting time of a preceding switching cycle.

11. The control circuit according to claim 10, comprising a detecting block configured to generate the trigger signal when said recirculation signal of said switching regulator crosses a trigger threshold, said counting block of said waiting block having an N-bit counter coupled in input to said detecting block and configured to count said impulses of said trigger signal during said waiting time.

12. The control circuit according to claim 11, wherein the waiting block comprises a measuring block coupled between said detecting block of said switching regulator and said adding block of said waiting block, said measuring block being configured to detect a period of oscillation in said recirculation signal.

13. The control circuit according to claim 10, wherein said waiting block comprises an initial waiting block configured to receive a control signal corresponding to a value of a load on said switching regulator, and configured to generate said fixed value of said waiting time as a function of said control signal.

14. A semiconductor device configured to control a switching regulator, comprising:
a control circuit formed on a semiconductor substrate and configured to:
generate, at an output, a switching control signal synchronized with oscillations of a recirculation signal of the switching regulator;
delay generation of the switching control signal for a selected waiting time in each switching cycle of the switching regulator while a power demand on the switching regulator is below a threshold; and
modify the selected waiting time according to a wavelength of the oscillations of the recirculation signal.

15. The semiconductor device of claim 14, comprising a switch formed on the semiconductor substrate with the control circuit and having a control input coupled to the output of the control circuit.

16. A method, comprising:
controlling operation of a switching regulator by generating a switching control signal and providing the switching control signal at an input terminal of a switch;
synchronizing the switching control signal with oscillations of a recirculation signal of the switching regulator;
delaying generation of the switching control signal for a selected waiting time in each switching cycle of the switching regulator in which a power demand on the switching regulator is below a threshold; and
selecting the waiting time in each switching cycle with reference to a wavelength of the oscillations of the recirculation signal during a preceding switching cycle.

17. The method of claim 16 wherein selecting the waiting time comprises selecting a first addend of the waiting time based on a value of the power demand, and selecting a second addend of the waiting time based on a period of the oscillations of the recirculation signal during the preceding switching cycle.

18. The method of claim 16 wherein selecting the first addend of the waiting time comprises varying a value of the first addend in inverse relation to variations in the power demand during the preceding switching cycle.

* * * * *